US010880070B1

(12) United States Patent
Delaney et al.

(10) Patent No.: US 10,880,070 B1
(45) Date of Patent: Dec. 29, 2020

(54) DISTRIBUTED BLOCKCHAIN LEDGER FOR VEHICULAR SYSTEMS

(71) Applicant: Rockwell Collins, Inc., Cedar Rapids, IA (US)

(72) Inventors: Kevin J. Delaney, Cedar Rapids, IA (US); Joseph G. Razo, Marion, IA (US); Diane D. McClatchy, Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 15/892,026

(22) Filed: Feb. 8, 2018

(51) Int. Cl.
*H04L 9/06* (2006.01)
*G06F 21/00* (2013.01)

(52) U.S. Cl.
CPC ............ *H04L 9/0637* (2013.01); *G06F 21/00* (2013.01)

(58) Field of Classification Search
CPC ..... H04L 2209/84; H04L 63/12; H04L 67/10; H04B 7/18506; G08G 5/0013; G08G 5/0008; H04W 4/42
See application file for complete search history.

(56) References Cited

U.S. PATENT DOCUMENTS

| | | | | |
|---|---|---|---|---|
| 2009/0010205 A1* | 1/2009 | Pratt, Jr. | ........... | H04W 56/0015 370/328 |
| 2011/0057830 A1* | 3/2011 | Sampigethaya | ...... | G01S 5/0072 342/36 |
| 2017/0331896 A1* | 11/2017 | Holloway | ................. | H04L 9/12 |
| 2017/0357009 A1* | 12/2017 | Raab | ....................... | G01S 19/48 |
| 2018/0225651 A1* | 8/2018 | Stone | ..................... | G06Q 30/06 |
| 2018/0270244 A1* | 9/2018 | Kumar | ................... | H04L 9/3239 |
| 2018/0342036 A1* | 11/2018 | Zachary | ................ | H04L 9/0637 |
| 2019/0066061 A1* | 2/2019 | Rencher | ........... | G06Q 10/06315 |
| 2019/0109713 A1* | 4/2019 | Clark | ..................... | G06Q 20/36 |

(Continued)

FOREIGN PATENT DOCUMENTS

WO  WO-2018212756 A1 * 11/2018 ........... H04L 9/3239

OTHER PUBLICATIONS

Li, S. et al. (2017). "Civil Aircraft Big Data Platform". 2017 IEEE 11th International Conference on Semantic Computing, pp. 328-333. (Year: 2017).*

(Continued)

*Primary Examiner* — Mohammed Waliullah
(74) *Attorney, Agent, or Firm* — Suiter Swantz pc llo (57) ABSTRACT

A system and method. The system may include a first computing device implemented in a vehicle that is a first node of a distributed blockchain ledger network. The first computing device may include a first processor and a first computer readable medium. The first processor may be configured to: maintain a first instance of a distributed blockchain ledger; receive data for entry in the first instance of the distributed blockchain ledger; write a record including the data in the first instance of the distributed blockchain ledger; determine a data link for forwarding the record to other nodes of the distributed blockchain ledger network; forward the record to the other nodes of the distributed blockchain ledger network, wherein the other nodes include a second computing device offboard of the vehicle, the second computing device configured to maintain a second instance of the distributed blockchain ledger; and validate the record.

19 Claims, 6 Drawing Sheets

(56) References Cited

U.S. PATENT DOCUMENTS

| | | | |
|---|---|---|---|
| 2019/0158597 A1* | 5/2019 | Evans | G08G 5/0017 |
| 2019/0172025 A1* | 6/2019 | Vieri | G06Q 20/0658 |
| 2019/0227515 A1* | 7/2019 | Fink | G06Q 10/087 |
| 2020/0007558 A1* | 1/2020 | Inokuchi | H04L 9/32 |

OTHER PUBLICATIONS

Gutierrez, C. (2017). "Boeing Improves Operations with Blockchain and the Internet of Things" May 24, 2017, downloaded from https://www.altoros.com/blog/boeing-improves-operations-with-blockchain-and-the-internet-of-things/, 7 pages. (Year: 2017).*
Dr. Arati Baliga, Understanding Blockchain Consensus Models, Apr. 2017, pp. 1-14, © 2017 Persistent Systems Ltd.

* cited by examiner

DISTRIBUTED BLOCKCHAIN LEDGER FOR VEHICULAR SYSTEMS

BACKGROUND

The value of blockchain is in the visibility of information and the ability for authenticated entities to validate any piece of information, which is shared between these entities. Within aviation, this poses a challenge on aircraft platforms in that aircraft systems are often designed to be isolated with no external connectivity and once connected only a limited number of systems may use that connectivity to and from the aircraft. Modern aircraft systems produce vast amounts of data. Safety systems today utilize the networked data flows to form aircraft functions such as recorders, maintenance functions and communication functions.

Currently, there are problems with whether electronic data created or observed on an aircraft can be trusted for use in flight operations or maintenance activities. Additionally, there are problems related to how to provide enough information to the aircraft such that data can be trusted. For example, the aircraft communications addressing and reporting system (ACARS) protocol may be impersonated by using inexpensive hardware and software, which can present serious security and operational disruption problems for aircraft and their corresponding operators. Additionally, for example, a typical information management system has a hybrid behavior in that data artifacts, which are produced and typically utilized locally on the aircraft (e.g. engine parameters, flight control positions, circuit breaker positions), can be validated and published within the scope of the aircraft; however, when such data artifacts are exchanged with entities offboard of the aircraft, current implementations have problems with addressing non-repudiation of the data and data authenticity concerns. Current attempts to solve such problems typically rely on security protection mechanisms to encrypt or obfuscate the data and provide a non-repudiation service to the datalink function. However, there are many disadvantages to current attempts to solve such problems. Disadvantages include custom implementation of security, non-standard development which can lead to inefficient or impossible system interoperation.

SUMMARY

In one aspect, embodiments of the inventive concepts disclosed herein are directed to a system. The system may include a first computing device implemented in a vehicle. The first computing device may be a first node of a distributed blockchain ledger network. The first computing device may include a first processor and a first non-transitory computer readable medium. The first processor may be configured to maintain a first instance of a distributed blockchain ledger in the first non-transitory computer readable medium. The first processor may be further configured to receive data for entry in the first instance of the distributed blockchain ledger. The first processor may be further configured to write a record including the data in the first instance of the distributed blockchain ledger. The first processor may be further configured to determine a data link for forwarding the record to other nodes of the distributed blockchain ledger network. The first processor may be further configured to forward, via the data link, the record to the other nodes of the distributed blockchain ledger network, wherein the other nodes include a second computing device offboard of the vehicle. The second computing device may be configured to maintain a second instance of the distributed blockchain ledger in a second non-transitory computer readable medium. The first processor may be further configured to validate the record based on a consensus received from the other nodes.

In a further aspect, embodiments of the inventive concepts disclosed herein are directed to a system. The system may include an avionics computing device implemented in an aircraft. The avionics computing device may be a first node of a distributed blockchain ledger network. The avionics computing device may include a first processor and a first non-transitory computer readable medium. The first processor may be configured to maintain a first instance of a distributed blockchain ledger in the first non-transitory computer readable medium. The first processor may be further configured to receive data for entry in the first instance of the distributed blockchain ledger. The first processor may be further configured to write a record including the data in the first instance of the distributed blockchain ledger. The first processor may be further configured to determine a data link for forwarding the record to other nodes of the distributed blockchain ledger network. The first processor may be further configured to forward, via the data link, the record to the other nodes of the distributed blockchain ledger network, wherein the other nodes include a second computing device offboard of the aircraft. The second computing device may be implemented in a ground control station. The second computing device may be configured to maintain a second instance of the distributed blockchain ledger in a second non-transitory computer readable medium. The first processor may be further configured to validate the record based on a consensus received from the other nodes.

In a further aspect, embodiments of the inventive concepts disclosed herein are directed to a method. The method may include maintaining, by a first processor of a first computing device implemented in a vehicle, a first instance of a distributed blockchain ledger in a first non-transitory computer readable medium of the first computing device, the first computing device being a first node of a distributed blockchain ledger network. The method may include receiving, by the first processor, data for entry in the first instance of the distributed blockchain ledger. The method may include writing, by the first processor, a record including the data in the first instance of the distributed blockchain ledger. The method may include determining, by the first processor, a data link for forwarding the record to other nodes of the distributed blockchain ledger network. The method may include forwarding, by the first processor and via the data link, the record to the other nodes of the distributed blockchain ledger network, wherein the other nodes include a second computing device offboard of the vehicle, the second computing device configured to maintain a second instance of the distributed blockchain ledger in a second non-transitory computer readable medium. The method may include validating, by the first processor, the record based on a consensus received from the other nodes.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method, which utilize a distributed blockchain ledger network having nodes (e.g., computing devices) implemented onboard a vehicle and offboard of the vehicle, whereby the distributed blockchain ledger network operates with or without connectivity between the onboard nodes and offboard nodes (e.g., computing devices implemented in a ground control station or in another vehicle). For example, the distributed blockchain ledger network may be an aircraft-centric blockchain ledger that operates with or without connectivity to ground entities. Embodiments may provide non-repudiation of data and authenticity of the data regardless of the source (e.g., onboard and/or offboard computing devices) of the data.

Embodiments may include a distributed blockchain ledger, which includes records of data. The distributed blockchain ledger may be distributed across one or more computing devices onboard a vehicle and one or more computing devices offboard of the vehicle. The distributed blockchain ledger may be implemented on a permissioned distributed blockchain ledger network or a permissionless distributed blockchain ledger network. For example, through publically sharing and synchronizing the distributed blockchain ledger, impersonation, spoofing, and rogue data insertion may be actively managed and avoided. For example, to be able to insert an unknown piece of data into data flows, the distributed blockchain ledger would have to contain a corresponding valid record, which would mean that most or all of the systems with access to the distributed blockchain ledger would be compromised. For example, given the volume of synchronized ledgers and the relative security protection of each, any possible attack would be muted due to difficultly and the breadth of any compromise that would be required to occur.

For example, use of the distributed blockchain ledger would allow a change of mode of operation of an aircraft to occur when the there is consensus to validate a record among the nodes; however, for example, when data links are in disconnected state for communications between the aircraft and offboard computing devices (e.g., of a ground control station and/or another vehicle), consensus might not be reached with respect to the distributed blockchain ledger, and the mode of operation of the aircraft may remain the same until a data link is established between the aircraft and offboard computing devices such that consensus to validate may be reached. Embodiments allow the distributed blockchain ledger to be brokered and synchronized in an intermittent connectivity environment between onboard computing devices and offboard computing devices, such as an aviation network environment where data links may switch from being available to unavailable and vice versa. Some embodiments may support the ability to synchronize the distributed blockchain ledger and create consensus for the distributed blockchain ledger among peer nodes based on routing decisions, which may be unique to aircraft and aircraft operations.

The use of block chain within the aircraft and datalink service providers may allow for an aircraft to validate a source of each message through the distributed blockchain ledger that may be shared with service providers and other aircraft.

Figure 1:
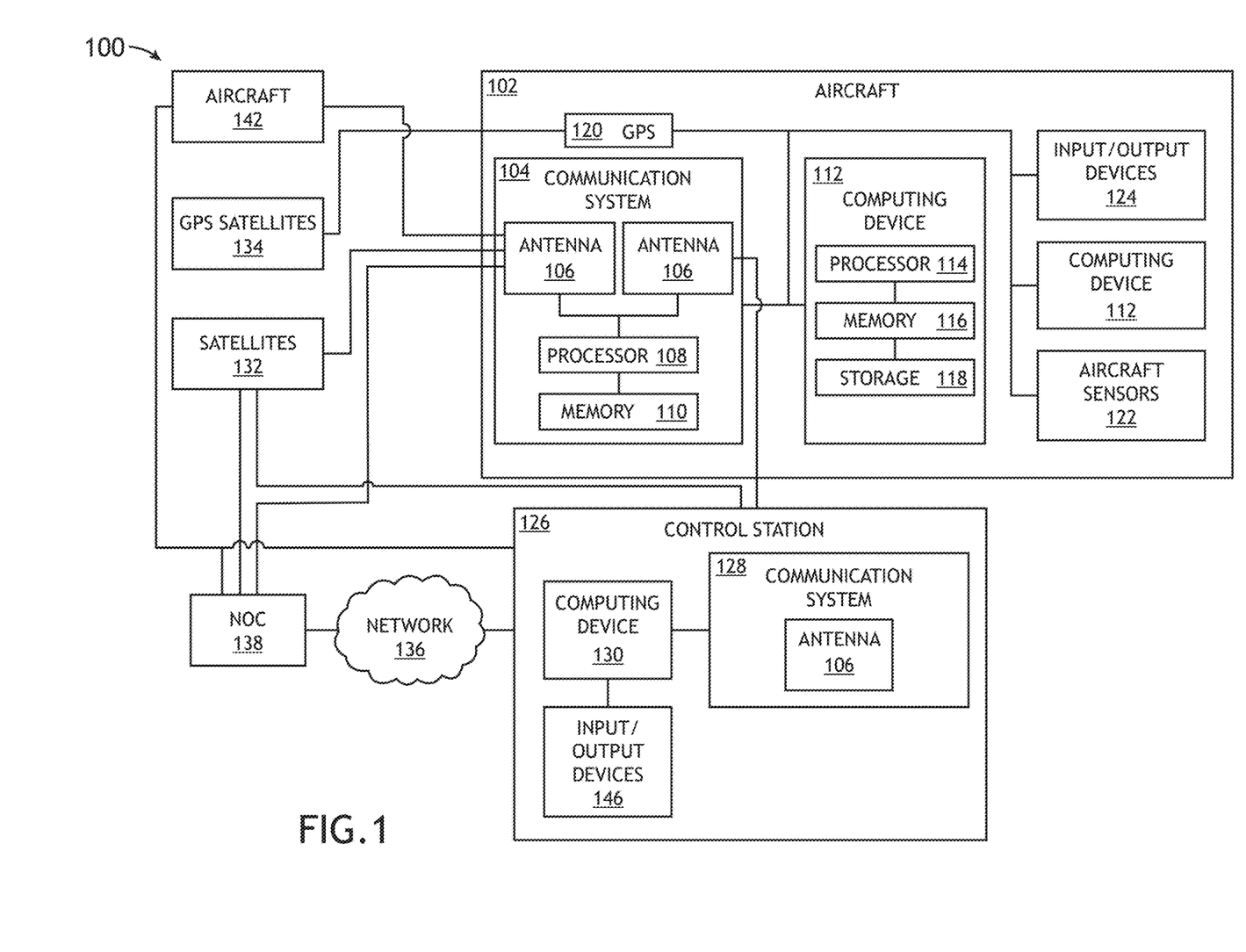
FIG. 1 is a view of an exemplary embodiment of a system according to the inventive concepts disclosed herein.

Referring now to FIG. 1, an exemplary embodiment of a system 100 according to the inventive concepts disclosed herein includes at least one aircraft 102, a control station 126, satellites 132, global positioning system (GPS) satellites 134, a network 136, a network operations center (NOC) 138, and aircraft 142. Some or all of the aircraft 102, the control station 126, the satellites 132, the GPS satellites 134, the network 136, the NOC 138, and the aircraft 142 may be communicatively coupled at any given time.

The aircraft 102 includes at least one communication system 104, a plurality of computing devices 112 (which may also be referred to as aircraft computing devices, helicopter computing devices, or vehicular computing devices as may be appropriate), a GPS device 120, aircraft sensors 122, and input/output devices 124, as well as other systems, equipment, and devices commonly included in aircraft. Some or all of the communication system 104, the computing devices 112, the GPS device 120, the aircraft sensors 122, the input/output devices 124, and any other systems, equipment, and devices commonly included in the aircraft 102 may be communicatively coupled. While not shown, in some embodiments, the aircraft 102 may optionally include a NOC or include components (e.g., at least one computing device 112 and/or the communication system 104) configured to perform functionality similar to the NOC 138. The aircraft 102 may be implemented as any suitable aircraft, such as a helicopter or airplane. The aircraft 102 may be a manned or unmanned aircraft. While the system 100 is exemplarily shown as including the aircraft 102, in some embodiments the inventive concepts disclosed herein may be implemented in or on any suitable vehicle (e.g., an automobile, train, submersible craft, watercraft, or spacecraft) or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles (e.g., the aircraft 142), the satellites 132, the NOC 138, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, a wired connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to the aircraft 142 and/or another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other and/or the communication system 104 for transmission to an off-board destination (e.g., satellites 132, NOC 138, control station 126, and/or aircraft 142). Likewise, each computing device 112 may be configured to receive data from another computing device 112 and/or the communication system 104 transmitted from off-board sources (e.g., satellites 132, NOC 138, control station 126). One or more of the computing devices 112 may include or may be implemented as and/or be configured to perform the functionality of any suitable aircraft system, such as an engine indication and crew alerting system (EICAS) computing device (e.g., 112-2), a flight management system (FMS) computing device (e.g., 112-3), an integrated flight information system (IFIS) computing device (e.g., 112-4), an information management system (IMS) computing device (e.g., 112-5), an onboard maintenance system (OMS) computing device (e.g., 112-6), a terrain awareness and warning system (TAWS) computing device (e.g., 112-7) an automatic dependent surveillance (ADS) computing device (e.g., 112-8), a traffic collision avoidance system (TCAS) computing device (e.g., 112-9), and an aircraft communications addressing and reporting system (ACARS) computing device (e.g., 112-10). (See, e.g., FIG. 4.) The processor 114 may be configured to run various software applications or computer code stored (e.g., maintained) in a non-transitory computer-readable medium (e.g., memory 116 or storage 118) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

One or more of the computing devices 112 may be implemented as and may serve as one or more onboard nodes of a distributed blockchain ledger network, which includes at least one onboard node and at least one offboard node.

For example, at least one processor 114 of a particular computing device 112 may be configured to perform various operations associated with distributed blockchain ledgers. For example, the processor 114 may be configured to maintain an instance of a distributed blockchain ledger in at least one non-transitory computer readable medium. The processor 114 may be configured to receive data (e.g., from another computing device 112, an offboard source, the input/output devices 124, and/or the aircraft sensors 122) for entry in the instance of the distributed blockchain ledger. The processor 114 may be configured to write a record including the data in the instance of the distributed blockchain ledger. The processor 114 may be configured to determine at least one data link for forwarding the record to other nodes of the distributed blockchain ledger network. The processor 114 may be configured to forward, via the at least one data link, the record to the other nodes of the distributed blockchain ledger network, wherein the other nodes include an offboard computing device (e.g., computing device 130 and/or a computing device of the aircraft 142) offboard of the aircraft, the offboard computing device configured to maintain a second instance of the distributed blockchain ledger in a non-transitory computer readable medium. Additionally, the processor 114 may be configured to validate the record based on a consensus received from the other nodes. Additionally, the processor 114 may receive records from other nodes of the distributed blockchain ledger network, determine whether the received records are valid, and forward a consensus message (e.g., a consensus vote) associated with the determined validity of the received record to the originating nodes.

Each computing device 112 (e.g., serving as one or more onboard nodes of the distributed blockchain ledger network) and offboard computing devices (e.g., computing device 130 and/or a computing device of the aircraft 142) may be subject to a disconnected state when data links between the computing devices 112 and the offboard computing devices are unavailable and a connected state when data links between the computing devices 112 and the offboard computing devices are available. Additionally, for example, at least one processor 114 of the particular computing device 112 may be configured to determine that the particular computing device 112 and an offboard computing device are in the disconnected state such that a data link for forwarding the record to other nodes of the distributed blockchain ledger network is unavailable. In response to determining, determine that the particular computing device 112 and the offboard computing device are in the disconnected state, the processor 114 may be configured to store the record in the at least one first non-transitory computer readable medium. The processor 114 may be configured to determine that the particular computing device 112 and the offboard computing device are in the connected state such that the data link for forwarding the record to other nodes of the distributed blockchain ledger network is available. In response to determining determine that the particular computing device 112 and the offboard computing device are in the connected state, the processor 114 may be configured to forward, via the data link, the stored record to the offboard computing device.

Figure 4:
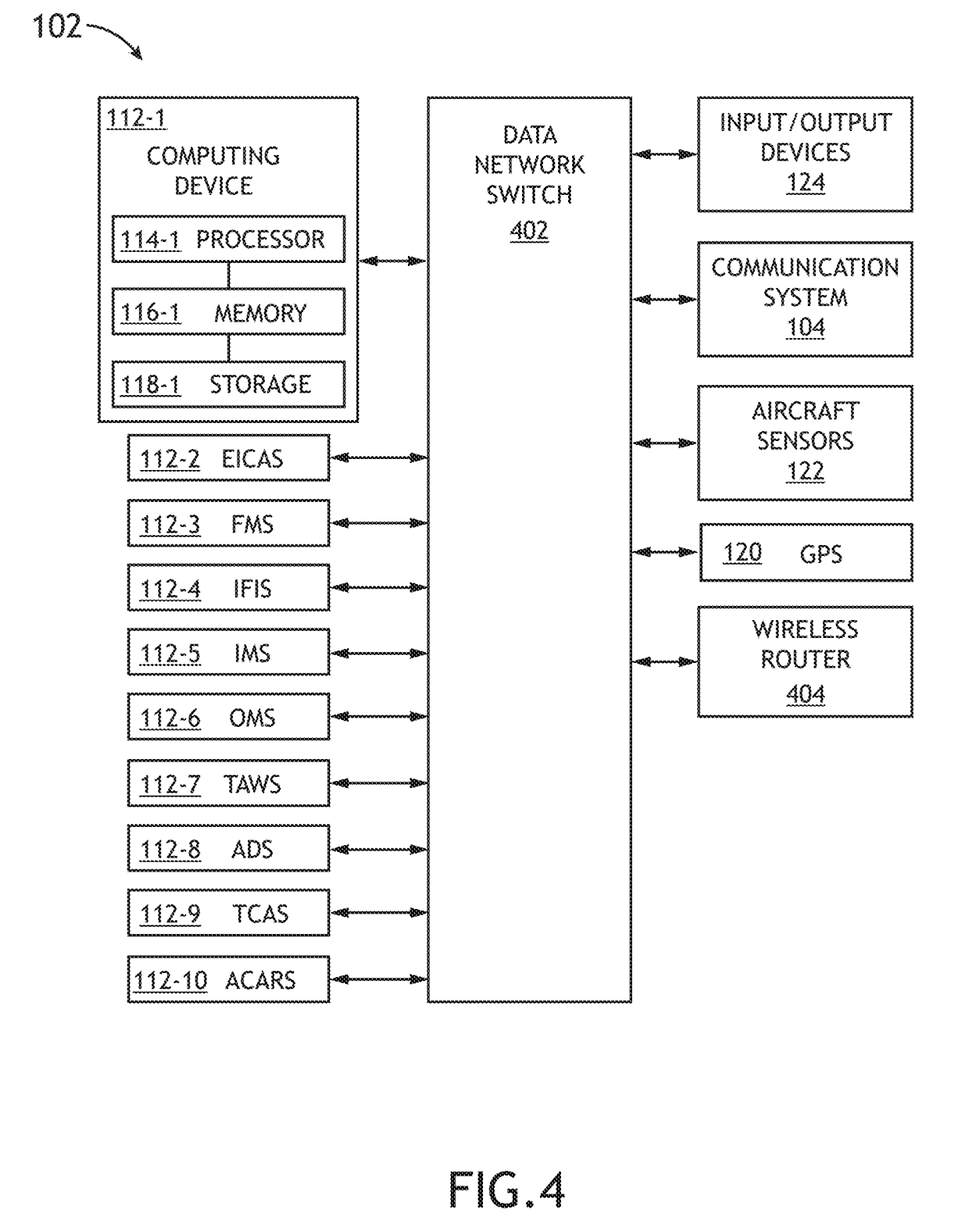
FIG. 4 is a view of exemplary devices of the aircraft of FIG. 1 communicatively coupled via a data network switch according to the inventive concepts disclosed herein.

Additionally, for example, at least one processor 114 of a particular computing device 112 may be configured to receive data, from any onboard or offboard source, for entry in the first instance of the distributed blockchain ledger. For example, the processor 114 may be configured to receive the data, from an avionics computing device (e.g., any of 112-1 through 112-10, as shown in FIG. 4), for entry in an instance of the distributed blockchain ledger. Additionally, for example, the processor 114 may be configured to receive uplink data, from a remote source (e.g., computing device 130 or a computing device of the aircraft 142), for entry in the instance of the distributed blockchain ledger, and the processor 114 may be configured to determine a validity of the uplink data.

Further, for example, at least one processor 114 of a particular computing device 112 may be configured to determine at least one data link for forwarding the record to other nodes of the distributed blockchain ledger network based at least on a predetermined priority level associated with a data type of the data. Additionally, for example, the processor 114 of a particular computing device 112 may be configured to determine at least one data link for forwarding the record to other nodes of the distributed blockchain ledger network by utilizing least-cost routing.

In some embodiments, each computing device 112 (e.g., serving as one or more onboard nodes of the distributed blockchain ledger network) and offboard computing devices (e.g., computing device 130 and/or a computing device of the aircraft 142) may maintain multiple distributed blockchain ledgers, which, for example, each may be associated with a different type or source of data. For example, at least one processor 114 of a particular computing device 112 may be configured to maintain an instance of a second distributed blockchain ledger in a non-transitory computer readable medium. The processor 114 may be configured to receive additional data (e.g., second data). The processor 114 may be configured to determine that the second data is associated with the second distributed blockchain ledger. The processor 114 may be configured to write a second record including the second data in the instance of the second distributed blockchain ledger. The processor 114 may be configured to determine at least one second data link for forwarding the second record to other nodes of the distributed blockchain ledger network. The processor 114 may be configured to forward, via the at least one second data link, the second record to the other nodes of the distributed blockchain ledger network. The processor 114 may be configured to validate the second record based on a second consensus received from the other nodes.

Further, for example, at least one processor 114 of a particular computing device 112 may be configured to securely relay a command or message to an avionics computing device (e.g., any of 112-1 through 112-10, as shown in FIG. 4) of the vehicle upon validation of the record.

In some embodiments, at least one processor 114 of each computing device 112 serving as one or more onboard nodes of the distributed blockchain ledger network may be configured to execute software modules maintained in a non-transitory computer readable medium so as to perform any of various operations as disclosed throughout. For example, at least one processor 114 of each computing device 112 serving as one or more onboard nodes of the distributed blockchain ledger network may be configured to execute software modules (e.g., airborne secure processing engine software module 518, media routing broker software module 502, blockchain consensus engine software module 504, blockchain shared ledger 506, blockchain assignment broker software module 508, and/or transaction authentication engine software module 510) shown in and described with respect to FIG. 5.

While functionality of a particular computing device 112 of the computing devices has been described, it will be appreciated that any number of the computing devices 112 may be configured to function similarly as and concurrently with the particular computing device 112.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, and the input/output devices 124. The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the aircraft 102, in other embodiments, the GPS device 120 may be implemented in or on any type of vehicle, such as automobiles, spacecraft, trains, watercraft, or submersible craft.

While the communication system 104, the computing devices 112, the GPS device 120, the aircraft sensors 122, and the input/output devices 124 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 may include at least one communication system 128, at least one computing device 130, and input/output devices 146, as well as other systems, equipment, and devices commonly included in a control station. Some or all of the communication system 128, the computing device 130, the input/output devices 146, and other systems, equipment, and devices commonly included in a control station may be communicatively coupled. The control station 126 may be implemented as a fixed location ground control station (e.g., a ground control station of an air traffic control tower, or a ground control station of a network operations center (e.g., 138)) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to the NOC 138 (e.g., via the network 136).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112, except that the computing device 130 may be implemented as an offboard node of the distributed blockchain ledger network. For example, a processor of the computing device 130 may be configured to maintain a second instance of the distributed blockchain ledger in a non-transitory computer readable medium. The input/output devices 146 may be implemented similarly to input/output devices 124 except that, in some embodiments, the input/output devices 146 may be configured for operation at a fixed location.

While the antennas 106 are exemplarily depicted as being implemented in the aircraft 102 and the control station 126, in some embodiments, antennas 106 may be implemented in, on, or coupled to any other suitable device, equipment, or system, such as the aircraft 142, a computing device (e.g., a laptop computing device, a mobile computing, a wearable computing device, or a smart phone), a mobile communication system (e.g., a man pack communication system), or satellites 132.

The network 136 may be implemented as any suitable network or combination of networks. For example, the network 136 may include or be implemented as the internet, a portion of the internet (such as a secured optical fiber network), an intranet, a wide area network (WAN), a local area network (LAN), and/or a mobile telecommunications network (e.g., a third generation (3G) network or a fourth generation (4G) network)). While the system 100 is exemplarily shown as including the network 136, the system 100 or various components of the system 100 may include or be communicatively coupled via any suitable number and any suitable types of networks.

The NOC 138 may connect a particular type of communications (e.g., satellite communications with the satellites 132 and/or aircraft communications with the aircraft 102 and/or the the aircraft 142 (e.g., UASs)) with the network 136.

The aircraft 142 may be implemented similarly to the aircraft 102, except that one or more computing devices of the aircraft 142 may be implemented as one or more offboard nodes of the distributed blockchain ledger network. For example, a processor of a computing device of the aircraft 142 may be configured to maintain a third instance of the distributed blockchain ledger in a non-transitory computer readable medium.

While FIG. 1 exemplarily includes elements as shown, in some embodiments, one or more of the elements of the system 100 may be omitted, or the system 100 may include other elements. For example, one or more of the GPS satellites 134, satellites 132, the control station 126, the network 136, the NOC 138, or the aircraft 142 may be optional. Additionally, while an embodiment has been depicted as including one control station (e.g., the control station 126), other embodiments may include any number of control stations of various types positioned or moving anywhere in the system 100.

Figure 2:
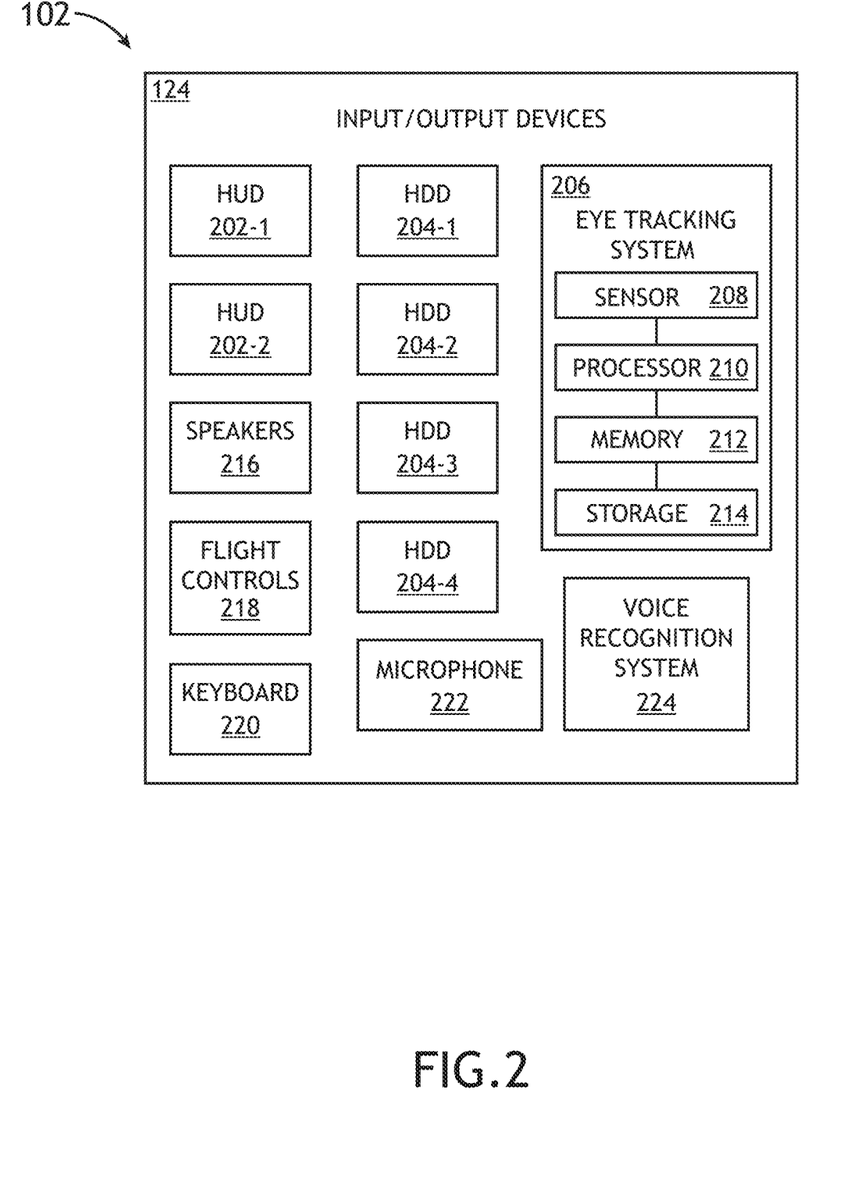
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one HDD, at least one adaptive flight display (AFD), a head wearable display device, or a combination thereof), at least one eye tracking system 206, speakers 216, vehicle control systems (e.g., flight controls 218), at least one tactile input device (e.g., at least one keyboard 220), at least one microphone 222, at least one voice recognition system 224, or a combination thereof, some or all of which may be communicatively coupled at any given time. While FIG. 2 depicts the various exemplary input/output devices 124, the input/output devices 124 may include any suitable input/output devices.

For example, the displays of the input/output devices 124 may include two HUDs 202-1, 202-2 (which may collectively be referred to as HUDs 202) and four HDDs 204-1, 204-2, 204-3, 204-4 (which may collectively be referred to as HDDs 204). Each of the HUDs 202 and the HDDs 204 may be configured to present streams of images (e.g., as video or still images) to a user (e.g., a pilot or an operator). In some embodiments, the HUDs 202 and/or HDDs 204 may be implemented as or include a touchscreen display. In some embodiments, one or more of the HUDs 202 and the HDDs 204 may include an integrated computing device (which may be implemented and function similarly to one of the computing devices 112 of FIG. 1) and/or integrated computing device components (which may be implemented and function similarly to components of one of the computing devices 112 of FIG. 1). Each of the HUDs 202 and the HDDs 204 may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122, see FIG. 3) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, the head wearable device 140, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

The voice recognition system 224 may include at least one microphone (e.g., microphone 222), at least one processor (not shown), memory (not shown), and storage (not shown), as well as other components, equipment, and/or devices commonly included in a voice recognition system. The microphone, the processor, the memory, and the storage, as well as the other components, equipment, and/or devices commonly included in a voice recognition system may be communicatively coupled. The voice recognition system 224 may be configured to recognize voice commands or audible inputs of a user. The voice recognition system 224 may allow the user to use verbal commands as an interaction and control method. The voice recognition system 224 may be configured to detect user commands and output user command data. The voice recognition system 224 may be integrated with the eye tracking system 206 so context of user inputs can be inferred. The processor may be configured to process data received from the microphone and output processed data (e.g., text data) to one of the computing devices 112. The processor may be configured to run various software applications or computer code stored in a non-transitory computer-readable medium and configured to execute various instructions or operations.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
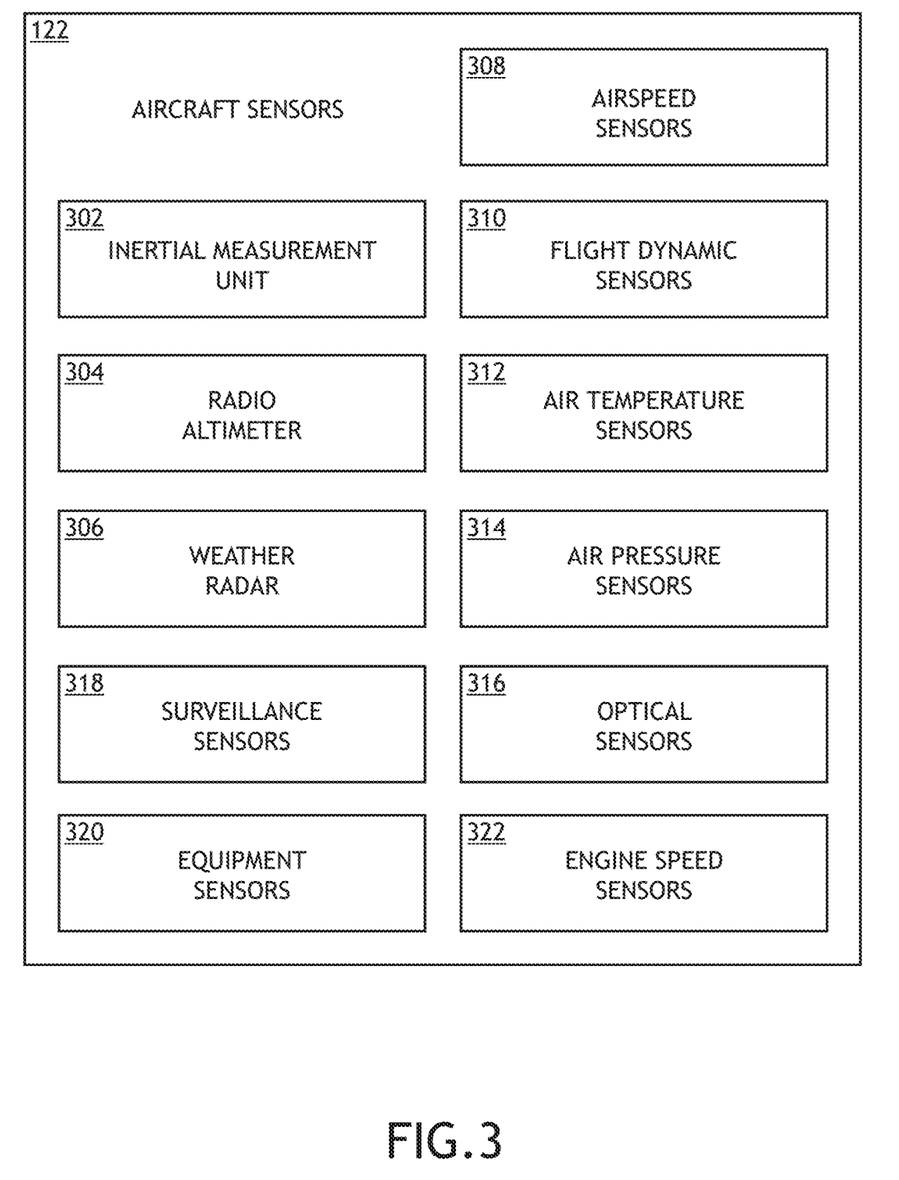
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, or a combination thereof). For example, the aircraft sensors 122 may include an inertial measurement unit 302, a radio altimeter 304, radar (e.g., weather 306, surveillance radar, and/or weapon radar), airspeed sensors 308, flight dynamic sensors 310 (e.g., configured to sense pitch, roll, and/or yaw), air temperature sensors 312, air pressure sensors 314, optical sensors 316 (e.g., cameras configured to capture images in the visible light spectrum and/or the infrared spectrum, such as forward looking infrared (FLIR) cameras and/or short-wavelength infrared (SWIR) cameras), sound ranging sensors (not shown), surveillance sensors 318, equipment sensors 320 (e.g., electrical system sensors, hydraulic system sensors, bleed air sensors, environmental conditioning sensors, fuel sensors, and/or fire warning/suppression sensors), and/or engine speed sensors 322, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft roll, aircraft yaw, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 108, processor 210, or a combination thereof).

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the aircraft 102, some embodiments may include vehicle sensors implemented on any suitable vehicle according to the inventive concepts disclosed herein.

Referring now to FIG. 4, various exemplary devices of the aircraft 102 of FIG. 1 communicatively coupled via a data network switch 402 (e.g., an avionics full-duplex Ethernet (AFDX) switch) are shown. For example, a plurality of computing devices 112 (e.g., avionics computing devices), the input/output devices 124, the communication system 104, vehicular sensors (e.g., the aircraft sensors 122), the GPS device 120, and a wireless router 404 may be communicatively coupled via the data network switch 402. Each of the plurality of avionics computing devices (e.g., 112-1, 112-2, 112-3, 112-4, 112-5, 112-6, 112-7, 112-8, 112-9, 112-10), the input/output devices 124, the communication system 104, vehicular sensors (e.g., the aircraft sensors 122), and the GPS device 120 may be configured to exchange (e.g., send and/or receive) avionics data with one another via the data network switch 402. While the plurality of computing devices 112, the input/output devices 124, the communication system 104, the aircraft sensors 122, the GPS device 120, and the wireless router 404 are exemplarily shown as being communicatively coupled via the data network switch 402, in some embodiments some or all of the plurality of computing devices 112, the input/output devices 124, the communication system 104, the vehicular sensors (e.g., the aircraft sensors 122), the GPS device 120, and the wireless router 404 may be communicatively coupled via any suitable data networks and via any suitable data networking components (e.g., at least one bus (e.g., Aeronautical Radio, Incorporated (ARINC) 429 busses and/or ARINC 717 busses), at least one data concentrator, at least one switch, at least one router, or a combination thereof).

The plurality of computing devices 112 may be implemented as and/or include a plurality of vetronics computing devices, such as a plurality of avionics computing devices (e.g., which may be implemented in one or more integrated modular avionics (IMA) cabinets). The plurality of avionics computing devices may include a first avionics computing device 112-1, a crew alerting system (CAS) computing device (e.g., an engine indication and crew alerting system (EICAS) computing device 112-2), a flight management system (FMS) computing device 112-3, an integrated flight information system (IFIS) computing device 112-4, an information management system (IMS) computing device 112-5, an onboard maintenance system (OMS) computing device 112-6, a terrain awareness and warning system (TAWS) computing device 112-7, an automatic dependent surveillance (ADS) computing device 112-8, a traffic collision avoidance system (TCAS) computing device 112-9, and an aircraft communications addressing and reporting system (ACARS) computing device 112-10, other surveillance applications, as well as other avionics computing devices commonly implemented in an aircraft. Additionally, the input/output devices 124, the communication system 104, the aircraft sensors 122, the data network switch 402, the wireless router 404, and the GPS device 120 may be considered to be devices of the plurality of avionics computing devices and may be implemented similarly as and function similarly as avionics devices (e.g., 112-1, 112-2, 112-3, 112-4, 112-5, 112-6, 112-7, 112-8, 112-9, 112-10) as disclosed throughout. Each of the plurality of avionics computing devices (e.g., 112-1, 112-2, 112-3, 112-4, 112-5, 112-6, 112-7, 112-8, 112-9, 112-10) may include components, which may be implemented and function similarly as the components of the computing devices 112 shown and described with respect to FIG. 1. As such, each of the plurality of avionics computing devices may include at least one processor, memory, and storage, which may be implemented and function similarly as the processor 114, the memory 116, and the storage 118, respectively, of the computing devices 112 shown and described with respect to FIG. 1. For example, the first avionics computing device 112-1 may include a processor 114-1, memory 116-1, and storage 118-1, which may be implemented and function similarly as the processor 114, the memory 116, and the storage 118, respectively, of the computing devices 112 shown and described with respect to FIG. 1. One or more of the plurality of avionics computing devices (e.g., 112-1, 112-2, 112-3, 112-4, 112-5, 112-6, 112-7, 112-8, 112-9, 112-10) may be implemented as and serve as one or more onboard nodes of the distributed blockchain ledger network.

The plurality of avionics computing devices (e.g., 112-1, 112-2, 112-3, 112-4, 112-5, 112-6, 112-7, 112-8, 112-9, 112-10) and/or processors thereof (e.g., 114-1) may be implemented as special purpose computers (e.g., the first avionics computing device 112-1, the EICAS computing device 112-2, the FMS computing device 112-3, the IFIS computing device 112-4, the IMS computing device 112-5, the OMS computing device 112-6, the TAWS computing device 112-7, the ADS computing device 112-8, the traffic collision avoidance system TCAS computing device 112-9, and the ACARS computing device 112-10) and/or special purpose processors (e.g., the processor 114-1 of the first avionics computing device 112-1 programmed to execute instructions for operations as disclosed throughout, a processor of the EICAS computing device 112-2 programmed to execute instructions for performing EICAS operations as disclosed throughout, a processor of the FMS computing device 112-3 programmed to execute instructions for performing FMS operations as disclosed throughout, a processor of the IFIS computing device 112-4 programmed to execute instructions for performing IFIS operations as disclosed throughout, a processor of the IMS computing device 112-5 programmed to execute instructions for performing IMS operations as disclosed throughout, a processor of the OMS computing device 112-6 programmed to execute instructions for performing OMS operations as disclosed throughout, a processor of the TAWS computing device 112-7 programmed to execute instructions for performing TAWS operations as disclosed throughout, a processor of the ADS computing device 112-8 programmed to execute instructions for performing ADS operations, a processor of the traffic collision avoidance system TCAS computing device 112-9 programmed to execute instructions for performing TCAS operations, and a processor of the ACARS computing device 112-10 programmed to execute instructions for performing ACARS operations) configured to execute instructions for performing any or all of the operations disclosed throughout.

Additionally, in some embodiments, the data network switch 402 may be implemented similarly as and function similarly to one of the avionics computing devices (e.g., 112-1, 112-2, 112-3, 112-4, 112-5, 112-6, 112-7, 112-8, 112-9, 112-10) or include components that function similarly to components of one of the avionics computing devices. For example, the data network switch 402 may include an integrated computing device (which may be implemented and function similarly to one of the computing devices 112 (e.g., one of the avionics computing devices (e.g., 112-1, 112-2, 112-3, 112-4, 112-5, 112-6, 112-7, 112-8, 112-9, 112-10))) and/or integrated computing device components (which may be implemented and function similarly to components of one of the computing devices 112 of FIG. 1).

Further, while the plurality of avionics computing devices has been exemplarily depicted and described with respect to FIG. 4 as including the first avionics computing device 112-1, the EICAS computing device 112-2, the FMS computing device 112-3, the IFIS computing device 112-4, the IMS computing device 112-5, the OMS computing device 112-6, the TAWS computing device 112-7, the ADS computing device 112-8, the traffic collision avoidance system TCAS computing device 112-9, and the ACARS computing device 112-10, in some embodiments, the plurality of avionics computing devices may omit one or more of the described and depicted avionics computing devices, include additional numbers of such avionics computing devices, and/or include other types of suitable avionics computing devices.

Figure 5:
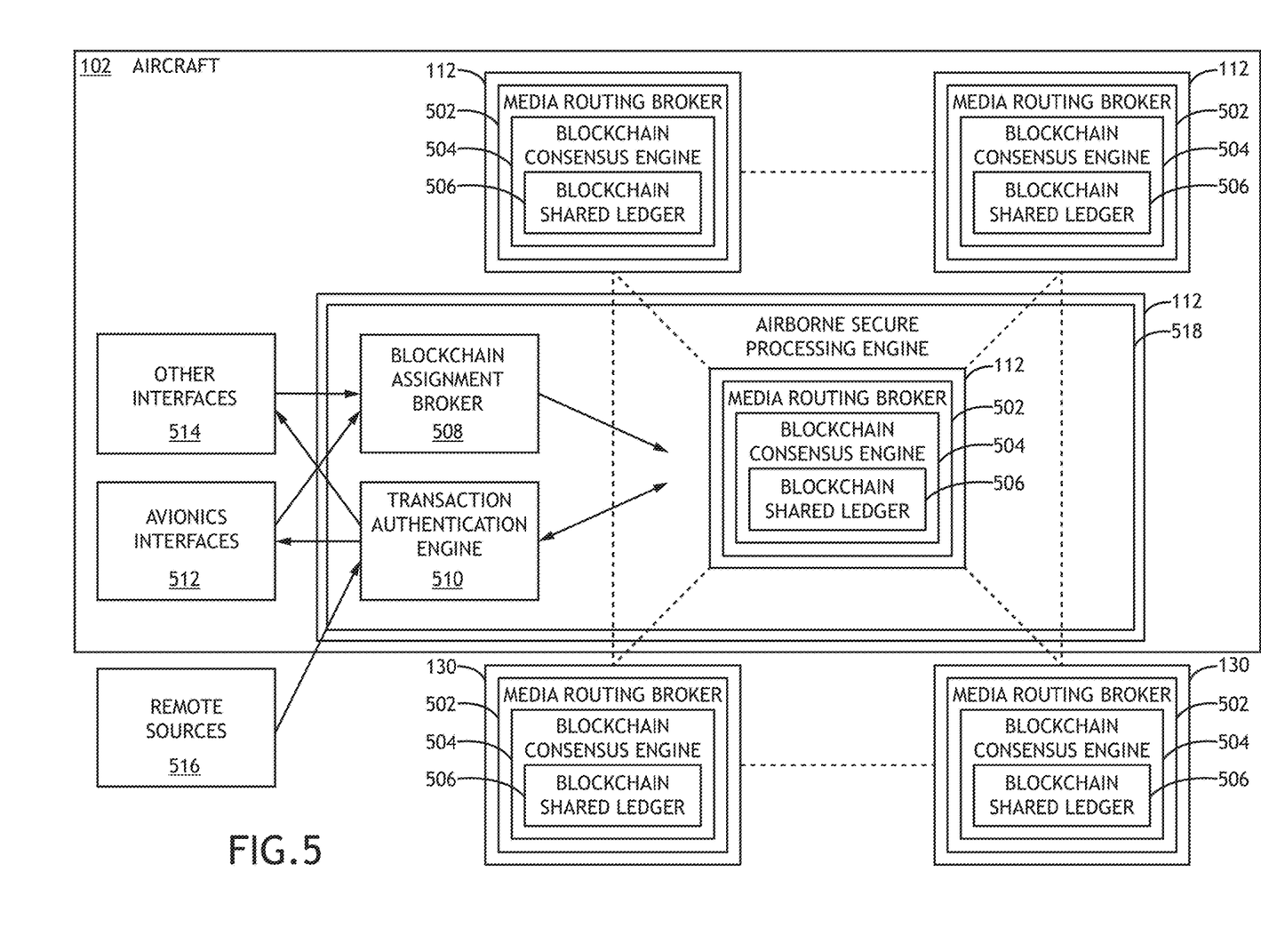
FIG. 5 is a view of an exemplary embodiment of a distributed blockchain ledger network according to the inventive concepts disclosed herein.

Referring now to FIG. 5, an exemplary embodiment of a distributed blockchain ledger network according to the inventive concepts disclosed herein is shown. The distributed blockchain ledger network may include at least one onboard node (e.g., three onboard nodes, which are implemented as three computing devices 112 of the aircraft 102, as shown) and at least one offboard node (e.g., two offboard nodes, which are implemented as two computing devices 130 of the control station 126, as shown). Additionally, the distributed blockchain ledger network may include remote sources 516.

Each of the computing devices (e.g., 112 and 130) serving as a node of the distributed blockchain ledger network may include at least one processor (e.g., 114) configured to execute software modules maintained in a non-transitory computer readable medium so as to perform any of various operations as disclosed throughout. For example, at least one processor (e.g., 114) of each computing device (e.g., 112 and 130) may be configured to execute software modules (e.g., airborne secure processing engine software module 518, media routing broker software module 502, blockchain consensus engine software module 504, blockchain shared ledger 506 (which may also be referred to as a distributed blockchain ledger), blockchain assignment broker software module 508, and/or transaction authentication engine software module 510) shown to perform operations as disclosed throughout.

With respect to a particular node, by executing the media routing broker software module 502, the processor may be configured to determine (e.g., select) at least one data link for forwarding a record to other nodes of the distributed blockchain ledger network. The determined data links are selected so as to allow for synchronization of the distributed blockchain ledger network. Determining the at least one data link for forwarding a record to other nodes of the distributed blockchain ledger network may be based on predetermined rules and conditions, such as may be defined by an operator or original equipment manufacturer (OEM).

With respect to a particular node, by executing the blockchain assignment broker software module 508, the processor may be configured to determine, with respect to received data, a corresponding (e.g., an appropriate) blockchain ledger associated with the received data where multiple distributed blockchain ledgers are maintained at each node. For example, the multiple distributed blockchain ledgers may each be associated with different types or sources of data. For example, the processor may be configured to make such determination based on a particular bus where the received data was received and/or based on a particular avionics computing device that sent the received data. That is, by executing the blockchain assignment broker software module 508, the processor may be configured to select which ledger is used for an applicable piece of data.

With respect to a particular node, by executing the transaction authentication engine software module 510, the processor may be configured to determine validity of data (e.g., uplink data or commands) intended for a particular destination computing device, for example, based on event association with the particular destination computing device's instance of the distributed blockchain ledger (e.g., by referencing the particular destination computing device's instance of the distributed blockchain ledger). By executing the transaction authentication engine software module 510, the processor may be configured to control whether data is routed to the particular destination computing device, whereby the routing decision may be based on the contents of the distributed blockchain ledger under consensus. Additionally, by executing the transaction authentication engine software module 510, the processor may be configured to securely relay commands or data to avionics computing devices which might require authenticity proven before usage, and such secure relay of commands or data may be applied to autonomous operations of aircraft where there may not be human input involved to validate inputted data (e.g., flight plan data over ACARS).

With respect to a particular node, by executing the blockchain consensus engine software module 504, the processor may be configured to execute a consensus protocol. Additionally, by executing the blockchain consensus engine software module 504, the processor may be configured to perform store and forward operations to address situations when connectivity is not available or not suitable given predetermined routing rules.

For example, with respect to a particular onboard node implemented as one of the computing devices 112, source data may be received (e.g., via avionics interfaces 512 (e.g., ARINC 429 busses and/or ARINC 717 busses) and/or other interfaces 514 (e.g., WiFi or ethernet); e.g., from an avionics computing device) by the processor 114. Execution of the blockchain assignment broker software module 508 may cause the processor 114 to write the record (e.g. source, timing, formats, translations, etc.) to a single or multiple distributed blockchain ledgers maintained at the node. The destination ledger may depend on the configuration of the system or how data schemas are structured. Once the record is created (e.g., written), the processor 114 may execute the blockchain consensus engine software module 504, which may cause the processor to synchronize the addition of the record to the ledgers of the other nodes (e.g., local and remote ledgers) of the network. For local ledgers the development of consensus may be swift as the data links may often be fixed (e.g., wired) and not depend on the state of the aircraft 102. For remote ledgers, execution of the media routing broker software module 502 may cause the processor 114 to ensure consensus through real-time selection of a data link by utilizing least-cost routing or by performing store and forward operations if no data link is available.

Additionally, for remote ledgers, execution of the media routing broker software module 502 may cause the processor 114 to determine at least one data link for forwarding the record to other nodes of the distributed blockchain ledger network based at least on a predetermined priority level associated with a data type of the data of the record. For example, a particular data type may have a high priority level that requires high connectivity, and the processor may select a data link(s) for ledger synchronization that is rarely disconnected. For example, a default path for blockchain consensus and synchronization may utilize high bandwidth, sometimes disconnected data links (e.g., cellular data links, Inmarsat Global Express data links, and/or Gogo ATG data links) that may be supplemented with low bandwidth, rarely disconnected datalinks (e.g., —ACARS data links, very high frequency (VHF) data links, and/or high frequency (HF) data links) to accommodate a finite action for the functions validated via blockchain. As such, execution of the media routing broker software module 502 may cause the processor 114 to perform adaptive communication management that can support various communication states of the aircraft 102 and aircraft systems.

As an illustrative example, a ground operator interfacing with one of the computing devices 130 may receive information from the aircraft 102 of an event (e.g., a fault) in the FMS computing device 112-3. If the distributed blockchain ledger is synchronized and in consensus, the ground operator is able to verify the fault (e.g., that the fault exists, the fault's source, the fault's contents, and time of the fault). For example, by utilizing the distributed blockchain ledger, a plurality of avionics computing devices 112 may all report the existence of the fault and establish the validity of the fault so that action can be taken in response to the fault. For example, the ground operator may send a command to the FMS computing device 112-3 to reset the fault. The FMS computing device 112-3 may utilize the same distributed blockchain ledger to verify the source of the command, the contents of the command, and the intent of the command.

Figure 6:
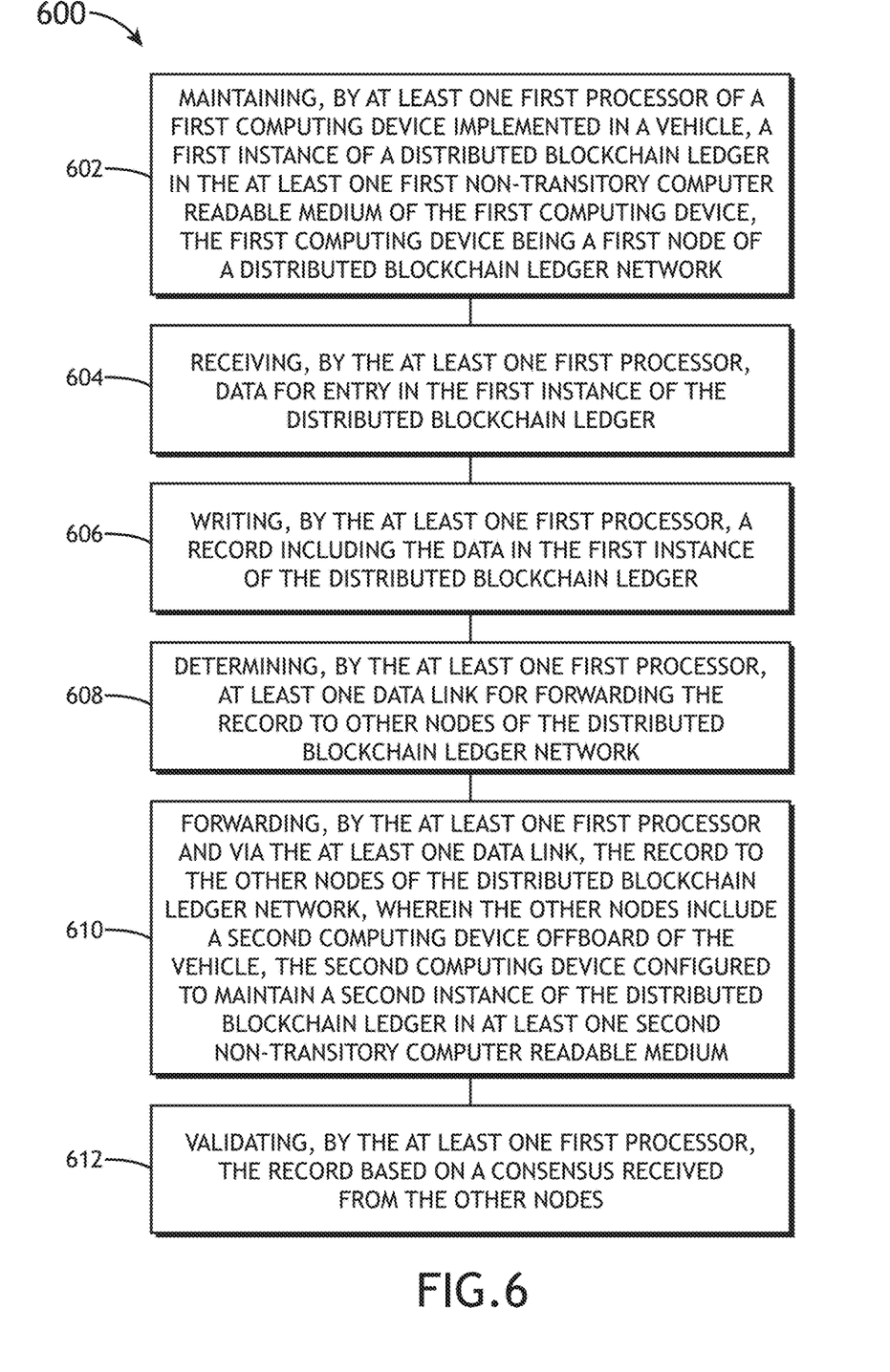
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include maintaining, by at least one first processor of a first computing device implemented in a vehicle, a first instance of a distributed blockchain ledger in at least one first non-transitory computer readable medium of the first computing device, the first computing device being a first node of a distributed blockchain ledger network.

A step 604 may include receiving, by the at least one first processor, data for entry in the first instance of the distributed blockchain ledger.

A step 606 may include writing, by the at least one first processor, a record including the data in the first instance of the distributed blockchain ledger.

A step 608 may include determining, by the at least one first processor, at least one data link for forwarding the record to other nodes of the distributed blockchain ledger network.

A step 610 may include forwarding, by the at least one first processor and via the at least one data link, the record to the other nodes of the distributed blockchain ledger network, wherein the other nodes include a second computing device offboard of the vehicle, the second computing device configured to maintain a second instance of the distributed blockchain ledger in at least one second non-transitory computer readable medium.

A step 612 may include validating, by the at least one first processor, the record based on a consensus received from the other nodes.

Further, the method may include any of the operations disclosed throughout.

As will be appreciated from the above, embodiments of the inventive concepts disclosed herein may be directed to a method and a system for implementing and operating a distributed blockchain ledger for vehicular systems.

As used throughout and as would be appreciated by those skilled in the art, "at least one non-transitory computer-readable medium" may refer to as at least one non-transitory computer-readable medium (e.g., memory 110, memory 116, memory 212, memory 116-1, storage 118, storage 214, storage 118-1, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a first computing device implemented in a vehicle, the first computing device being a first node of a distributed blockchain ledger network, the first computing device comprising at least one first processor and at least one first non-transitory computer readable medium, the at least one first processor configured to:
  maintain a first instance of a distributed blockchain ledger in the at least one first non-transitory computer readable medium;
  receive data for entry in the first instance of the distributed blockchain ledger;
  write a record including the data in the first instance of the distributed blockchain ledger;
  determine at least one data link for forwarding the record to other nodes of the distributed blockchain ledger network;
  forward, via the at least one data link, the record to the other nodes of the distributed blockchain ledger network, wherein the other nodes include a second computing device off board of the vehicle, the second computing device configured to maintain a second instance of the distributed blockchain ledger in at least one second non-transitory computer readable medium; and
  validate the record based on a consensus received from the other nodes;
wherein the first computing device and the second computing device are subject to a disconnected state when data links between the first computing device and the second computing device are unavailable and a connected state when data links between the first computing device and the second computing device are available;
wherein the at least one first processor is further configured to:
  determine that the first computing device and the second computing device are in the disconnected state such that a data link for forwarding the record to other nodes of the distributed blockchain ledger network is unavailable;
  in response to determining that the first computing device and the second computing device are in the disconnected state, store the record in the at least one first non-transitory computer readable medium;
  determine that the first computing device and the second computing device are in the connected state such that the data link for forwarding the record to other nodes of the distributed blockchain ledger network is available; and
  in response to determining that the first computing device and the second computing device are in the connected state, forward, via the data link, the stored record to the second computing device;
wherein the at least one first processor is further configured to:
  determine at least one data link for forwarding the record to other nodes of the distributed blockchain ledger network based at least on a predetermined priority level associated with a data type of the data;
wherein the at least one first processor is further configured to:
  determine at least one data link for forwarding the record to other nodes of the distributed blockchain ledger network by utilizing least-cost routing;
wherein the first computing device is an engine indication and crew alerting system (EICAS) computing device, a flight management system (FMS) computing device, an integrated flight information system (IFIS) computing device, an information management system (IMS) computing device, an onboard maintenance system (OMS) computing device, a terrain awareness and warning system (TAWS) computing device, or a traffic collision avoidance system (TCAS) computing device.

2. The system of claim 1, wherein the at least one first processor is further configured to:
receive the data, from an avionics computing device, for entry in the first instance of the distributed blockchain ledger.

3. The system of claim 1, wherein the at least one first processor is further configured to:
receive uplink data, from a remote source, for entry in the first instance of the distributed blockchain ledger.

4. The system of claim 3, wherein the at least one first processor is further configured to:
determine a validity of the uplink data.

5. The system of claim 1, wherein the at least one first processor is further configured to:
maintain a first instance of a second distributed blockchain ledger in the at least one first non-transitory computer readable medium;
receive second data;
determine that the second data is associated with the second distributed blockchain ledger;

write a second record including the second data in the first instance of the second distributed blockchain ledger;
determine at least one second data link for forwarding the second record to other nodes of the distributed blockchain ledger network;
forward, via the at least one second data link, the second record to the other nodes of the distributed blockchain ledger network; and
validate the second record based on a second consensus received from the other nodes.

6. The system of claim 1, wherein the at least one first processor is further configured to:
securely relay a command or message to an avionics computing device of the vehicle upon validation of the record.

7. The system of claim 1, further comprising a third computing device implemented in the vehicle, the third computing device being one of the other nodes of the distributed blockchain ledger network, the first computing device communicatively coupled to the third computing device, the third computing device comprising at least one third processor and at least one third non-transitory computer readable medium, the at least one third processor configured to:
maintain a third instance of the distributed blockchain ledger in the at least one third non-transitory computer readable medium.

8. The system of claim 1, wherein the first computing device is the flight management system (FMS) computing device.

9. The system of claim 8, wherein the at least one first processor is further configured to:
maintain a first instance of a second distributed blockchain ledger in the at least one first non-transitory computer readable medium;
receive second data;
determine that the second data is associated with the second distributed blockchain ledger;
write a second record including the second data in the first instance of the second distributed blockchain ledger;
determine at least one second data link for forwarding the second record to other nodes of the distributed blockchain ledger network;
forward, via the at least one second data link, the second record to the other nodes of the distributed blockchain ledger network; and
validate the second record based on a second consensus received from the other nodes.

10. The system of claim 9, wherein the at least one first processor is further configured to:
determine at least one data link for forwarding the record to other nodes of the distributed blockchain ledger network by utilizing least-cost routing.

11. The system of claim 10, further comprising a third computing device implemented in the vehicle, the third computing device being one of the other nodes of the distributed blockchain ledger network, the first computing device communicatively coupled to the third computing device, the third computing device comprising at least one third processor and at least one third non-transitory computer readable medium, the at least one third processor configured to:
maintain a third instance of the distributed blockchain ledger in the at least one third non-transitory computer readable medium.

12. The system of claim 11, wherein the distributed blockchain ledger network is permissioned.

13. The system of claim 1, wherein the vehicle is an aircraft.

14. The system of claim 13, wherein the first computing device is an avionics computing device.

15. The system of claim 13, wherein the second computing device is implemented in a ground control station.

16. The system of claim 1, wherein the distributed blockchain ledger network is permissioned.

17. The system of claim 1, wherein the distributed blockchain ledger network is permission less.

18. A system, comprising:
an avionics computing device implemented in an aircraft, the avionics computing device being a first node of a distributed blockchain ledger network, the avionics computing device comprising at least one first processor and at least one first non-transitory computer readable medium, the at least one first processor configured to:
maintain a first instance of a distributed blockchain ledger in the at least one first non-transitory computer readable medium;
receive data for entry in the first instance of the distributed blockchain ledger;
write a record including the data in the first instance of the distributed blockchain ledger;
determine at least one data link for forwarding the record to other nodes of the distributed blockchain ledger network;
forward, via the at least one data link, the record to the other nodes of the distributed blockchain ledger network, wherein the other nodes include a second computing device offboard of the aircraft, the second computing device implemented in a ground control station, the second computing device configured to maintain a second instance of the distributed blockchain ledger in at least one second non-transitory computer readable medium; and
validate the record based on a consensus received from the other nodes;
wherein the avionics computing device and the second computing device are subject to a disconnected state when data links between the avionics computing device and the second computing device are unavailable and a connected state when data links between the avionics computing device and the second computing device are available;
wherein the at least one first processor is further configured to:
determine that the first computing device and the second computing device are in the disconnected state such that a data link for forwarding the record to other nodes of the distributed blockchain ledger network is unavailable;
in response to determining that the first computing device and the second computing device are in the disconnected state, store the record in the at least one first non-transitory computer readable medium;
determine that the first computing device and the second computing device are in the connected state such that the data link for forwarding the record to other nodes of the distributed blockchain ledger network is available; and
in response to determining that the first computing device and the second computing device are in the connected state, forward, via the data link, the stored record to the second computing device;

wherein the at least one first processor is further configured to:
    determine at least one data link for forwarding the record to other nodes of the distributed blockchain ledger network based at least on a predetermined priority level associated with a data type of the data;
wherein the at least one first processor is further configured to:
    determine at least one data link for forwarding the record to other nodes of the distributed blockchain ledger network by utilizing least-cost routing;
wherein the first computing device is an engine indication and crew alerting system (EICAS) computing device, a flight management system (FMS) computing device, an integrated flight information system (IFIS) computing device, an information management system (IMS) computing device, an onboard maintenance system (OMS) computing device, a terrain awareness and warning system (TAWS) computing device, or a traffic collision avoidance system (TCAS) computing device.

19. A method, comprising:
    maintaining, by at least one first processor of a first computing device implemented in a vehicle, a first instance of a distributed blockchain ledger in at least one first non-transitory computer readable medium of the first computing device, the first computing device being a first node of a distributed blockchain ledger network;
    receiving, by the at least one first processor, data for entry in the first instance of the distributed blockchain ledger;
    writing, by the at least one first processor, a record including the data in the first instance of the distributed blockchain ledger;
    determining, by the at least one first processor, at least one data link for forwarding the record to other nodes of the distributed blockchain ledger network;
    forwarding, by the at least one first processor and via the at least one data link, the record to the other nodes of the distributed blockchain ledger network, wherein the other nodes include a second computing device off-board of the vehicle, the second computing device configured to maintain a second instance of the distributed blockchain ledger in at least one second non-transitory computer readable medium;
    validating, by the at least one first processor, the record based on a consensus received from the other nodes, wherein the first computing device and the second computing device are subject to a disconnected state when data links between the first computing device and the second computing device are unavailable and a connected state when data links between the first computing device and the second computing device are available;
    determining, by the at least one first processor, that the first computing device and the second computing device are in the disconnected state such that a data link for forwarding the record to other nodes of the distributed blockchain ledger network is unavailable;
    in response to determining that the first computing device and the second computing device are in the disconnected state, storing, by the at least one first processor, the record in the at least one first non-transitory computer readable medium;
    determining, by the at least one first processor, that the first computing device and the second computing device are in the connected state such that the data link for forwarding the record to other nodes of the distributed blockchain ledger network is available;
    in response to determining that the first computing device and the second computing device are in the connected state, forwarding, by the at least one first processor and via the data link, the stored record to the second computing device;
    determining, by the at least one first processor, at least one data link for forwarding the record to other nodes of the distributed blockchain ledger network based at least on a predetermined priority level associated with a data type of the data; and
    determining, by the at least one first processor, at least one data link for forwarding the record to other nodes of the distributed blockchain ledger network by utilizing least-cost routing;
wherein the first computing device is an engine indication and crew alerting system (EICAS) computing device, a flight management system (FMS) computing device, an integrated flight information system (IFIS) computing device, an information management system (IMS) computing device, an onboard maintenance system (OMS) computing device, a terrain awareness and warning system (TAWS) computing device, or a traffic collision avoidance system (TCAS) computing device.

* * * * *